US006296688B1

(12) United States Patent
Cheng et al.

(10) Patent No.: US 6,296,688 B1
(45) Date of Patent: Oct. 2, 2001

(54) VACUUM SWING ADSORPTION PROCESS FOR SEPARATING PROPYLENE FROM PROPANE

(75) Inventors: Linda S. Cheng, Chicago; Stephen T. Wilson, Libertyville, both of IL (US)

(73) Assignee: UOP LLC, Des Plaines, IL (US)

( * ) Notice: Subject to any disclaimer, the term of this patent is extended or adjusted under 35 U.S.C. 154(b) by 0 days.

(21) Appl. No.: 09/449,656

(22) Filed: Nov. 30, 1999

(51) Int. Cl.$^7$ .................................................. B01D 53/047
(52) U.S. Cl. .................... 95/101; 95/102; 95/105; 95/144; 95/902
(58) Field of Search .......................... 95/96–107, 110, 95/111, 144, 900, 902

(56) References Cited

U.S. PATENT DOCUMENTS

| | | | |
|---|---|---|---|
| Re. 29,941 | * 3/1979 | Bird | 95/98 X |
| 2,978,407 | * 4/1961 | Tuttle et al. | 95/104 X |
| 3,176,444 | 4/1965 | Kiyonaga | 55/26 |
| 3,176,445 | * 4/1965 | Collins et al. | 95/144 X |
| 3,266,221 | * 8/1966 | Avery | 95/144 X |
| 3,306,006 | * 2/1967 | Urban | 95/144 X |
| 3,430,418 | 3/1969 | Wagner | 55/25 |
| 3,703,068 | 11/1972 | Wagner | 55/21 |
| 3,727,376 | * 4/1973 | Szirmay | 95/111 |
| 3,986,849 | 10/1976 | Fuderer et al. | 55/25 |
| 4,070,164 | * 1/1978 | Miwa et al. | 95/101 |
| 4,310,440 | 1/1982 | Wilson et al. | 252/435 |
| 4,554,141 | * 11/1985 | Scull et al. | 95/144 |
| 4,567,029 | 1/1986 | Wilson et al. | 423/306 |
| 4,769,047 | * 9/1988 | Dye | 95/97 |
| 4,861,938 | 8/1989 | Lewis et al. | 585/640 |
| 4,973,792 | 11/1990 | Lewis et al. | 585/638 |
| 5,095,163 | 3/1992 | Barger | 585/640 |
| 5,104,425 | * 4/1992 | Rao et al. | 95/144 X |
| 5,126,308 | 6/1992 | Barger et al. | 502/214 |
| 5,171,333 | * 12/1992 | Maurer | 95/103 X |
| 5,191,141 | 3/1993 | Barger et al. | 585/640 |
| 5,245,099 | * 9/1993 | Mitariten | 95/144 X |
| 5,365,011 | 11/1994 | Ramachandran et al. | 585/829 |
| 5,507,857 | * 4/1996 | Kumar et al. | 95/144 X |
| 5,518,527 | * 5/1996 | Tomizuka et al. | 95/144 X |
| 5,672,197 | 9/1997 | Rothchild | 95/98 |
| 5,744,687 | 4/1998 | Ramachandran et al. | 585/829 |

OTHER PUBLICATIONS

Article entitled "Better Ethylene Separation Unit" by V. Kaiser and M. Picciotti, *Hydrocarbon Processing*, Nov. 1988, pp. 57–61.

Paper entitled "Olefin–Paraffin Separations by Adsorption: Equilibrium Separation by π–Complexation vs. Kinetic Separation" by S.U. Rege, J. Padin, and R.T. Yang, *AIChE Journal*, vol. 44, 1998, p. 799.

* cited by examiner

Primary Examiner—Robert H. Spitzer
(74) Attorney, Agent, or Firm—John G. Tolomei; Frank S. Molinaro; Richard P. Silverman

(57) ABSTRACT

A vacuum swing adsorption process is provided for the separation of propylene from a feedstream comprising propylene and propane using an adsorbent comprising AlPO-14 to produce a high purity propylene product stream at high recovery. The vacuum swing adsorption process of the present invention can be employed in a variety of petroleum refining and petrochemical processes to purify and separate propylene from mixtures of propylene and propane alone or in combination with fractionation.

9 Claims, 5 Drawing Sheets

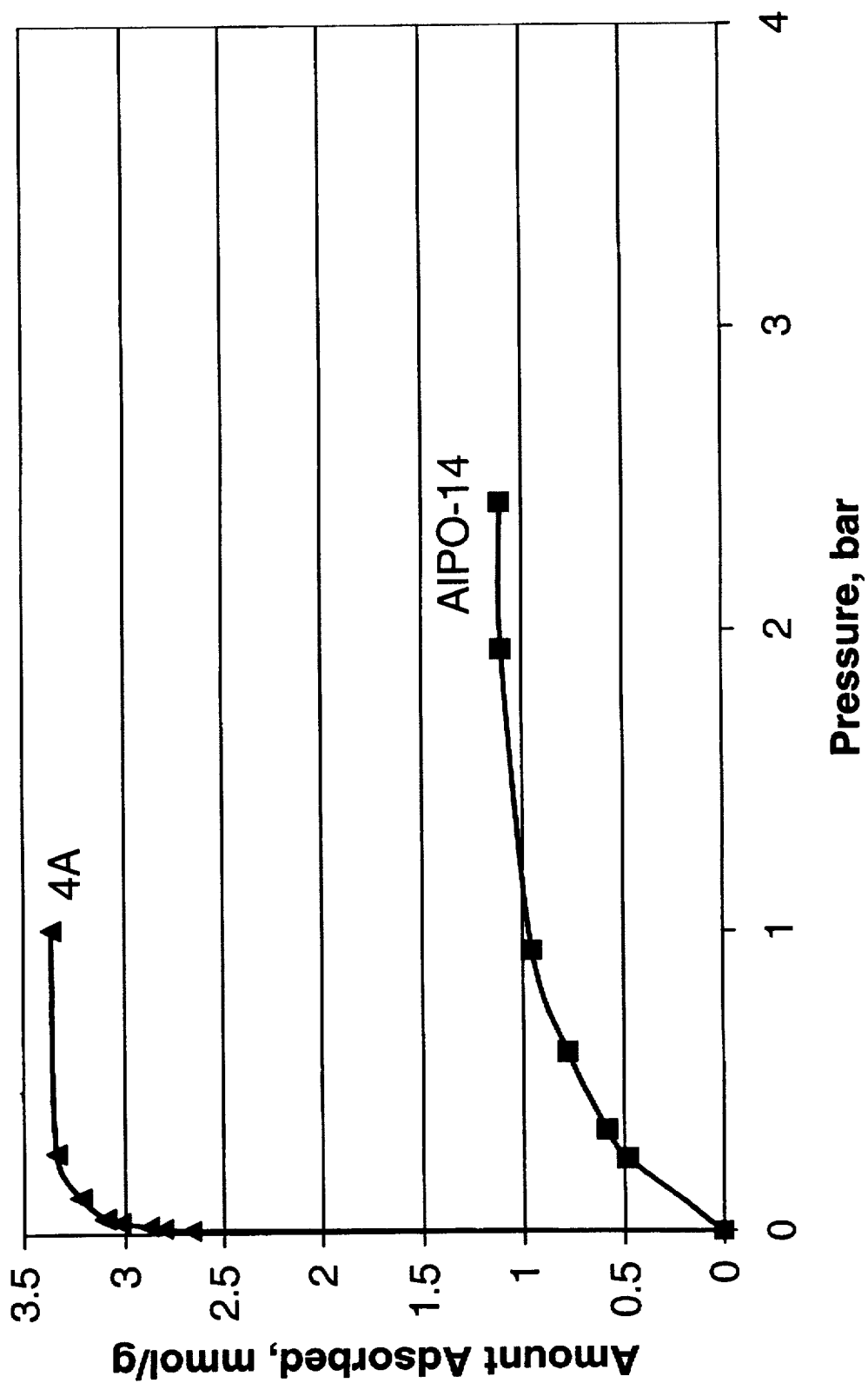

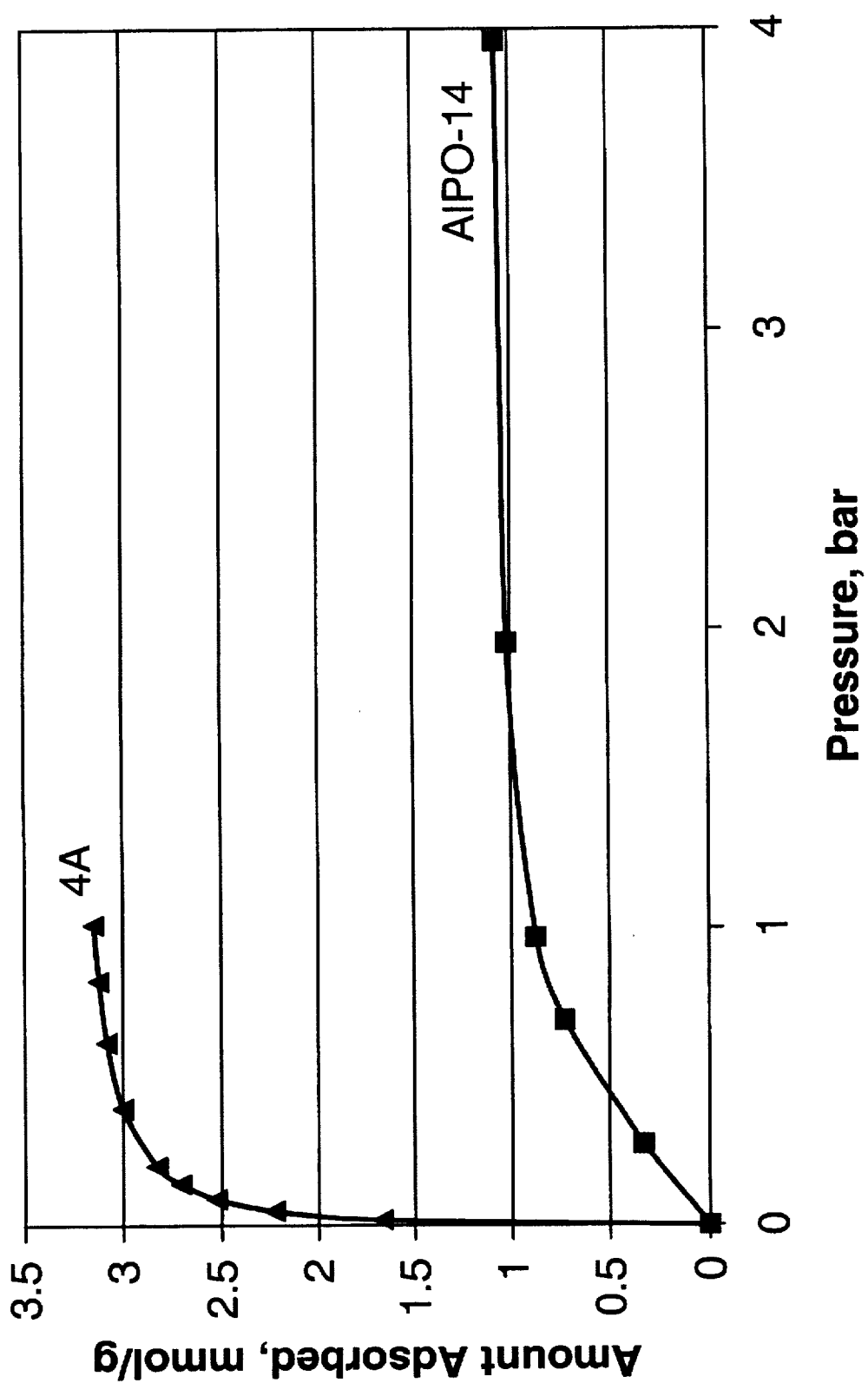
FIG. 2 ADSORPTION ISOTHERM AT 70 °C

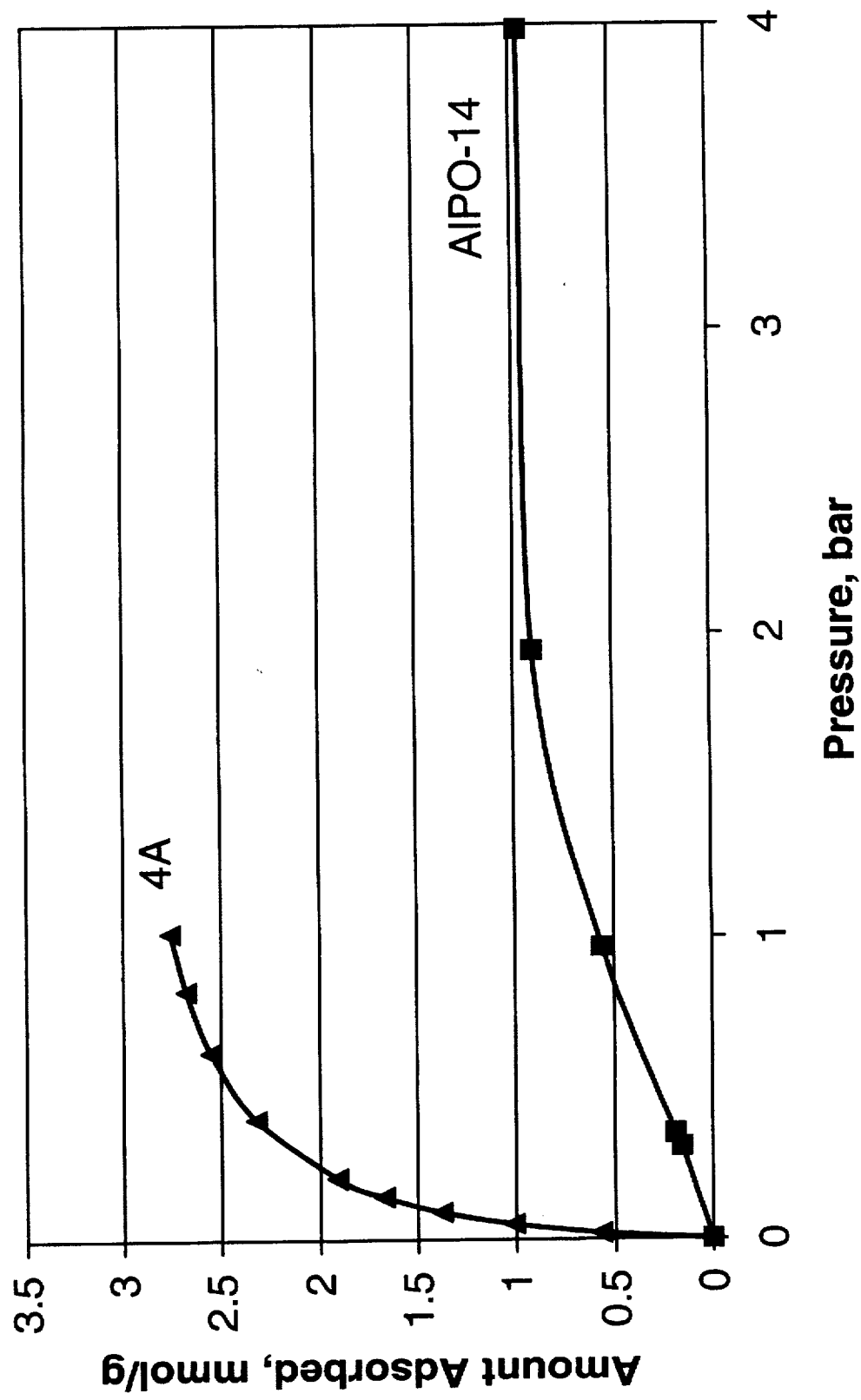
FIG. 3 ADSORPTION ISOTHERM AT 120 °C

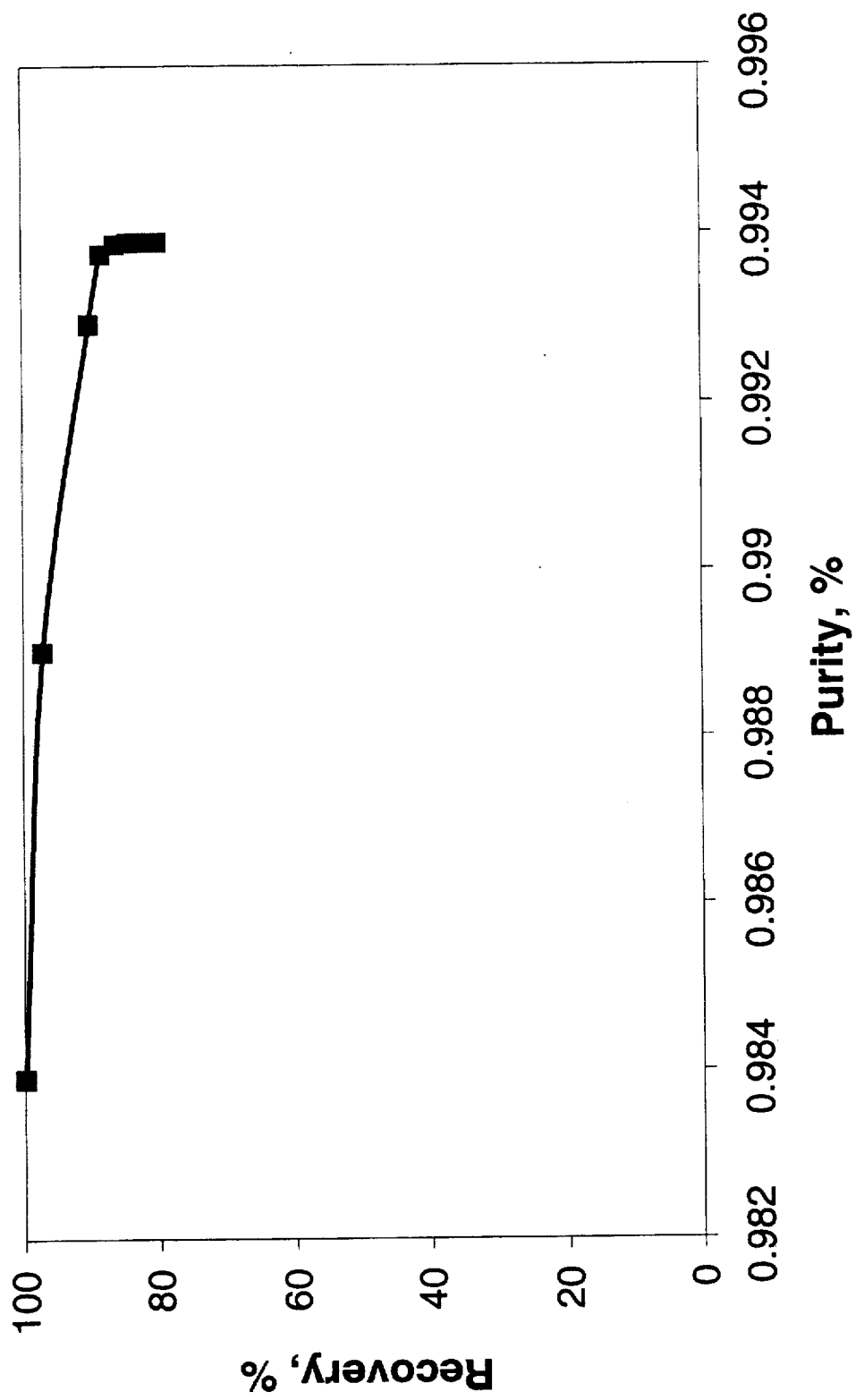

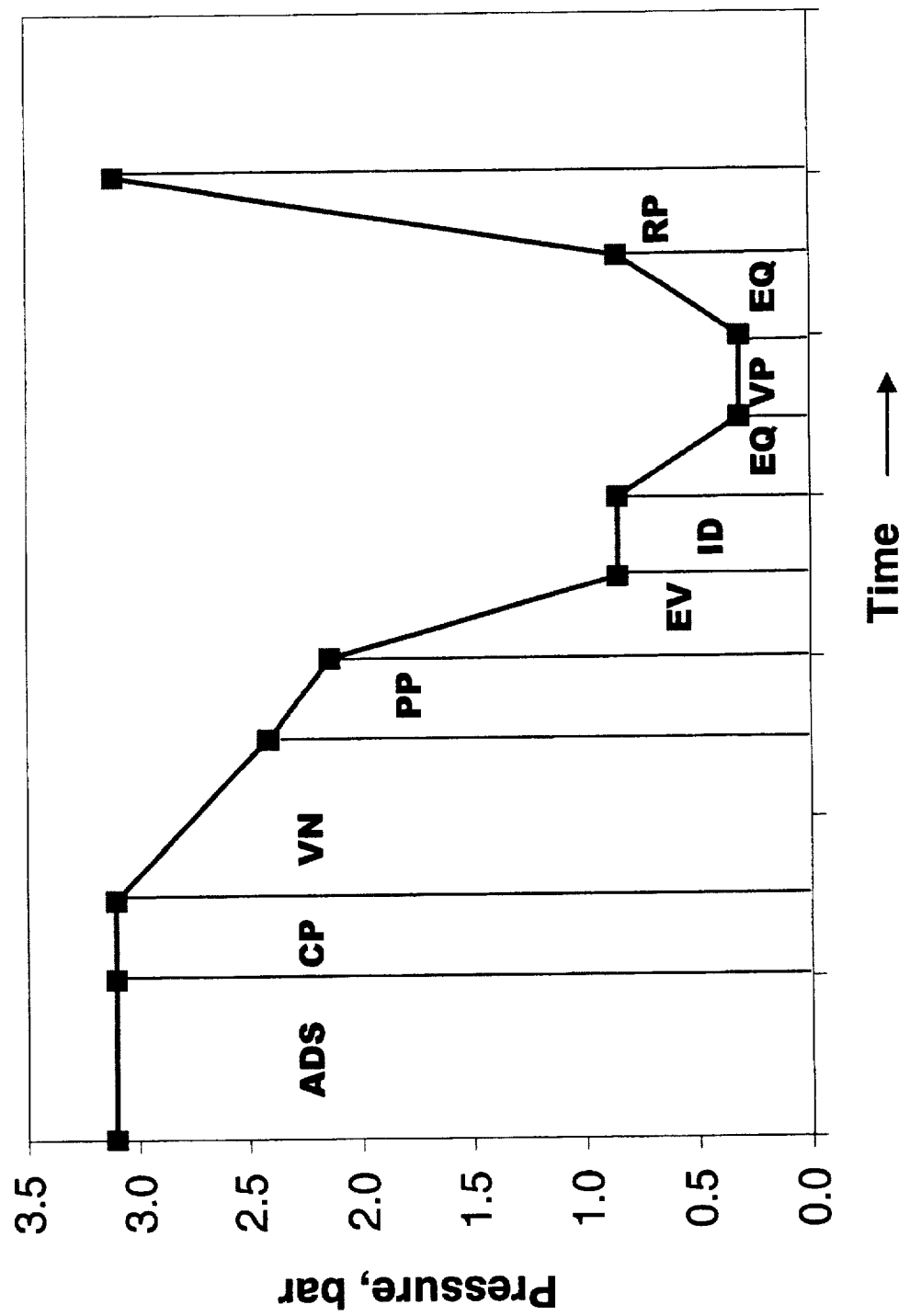
FIG. 5 Pressure Profile

VACUUM SWING ADSORPTION PROCESS FOR SEPARATING PROPYLENE FROM PROPANE

FIELD OF THE INVENTION

This invention pertains to the field of separating and recovering at least one gas component from a feedstream by an adsorption process. More particularly, the present invention relates to a vacuum swing adsorption process for separating a hydrocarbon feed gas comprising propylene and propane into a fraction comprising predominantly propylene and a fraction comprising propane.

BACKGROUND OF THE INVENTION

Light olefins serve as the building blocks for the production of numerous chemicals. Light olefins have traditionally been produced through the process of steam or catalytic cracking. Propylene, a light olefin consisting of three carbon atoms wherein two of the carbon atoms are joined by a double bond, has a great number of commercial applications, particularly in the manufacture of polypropylene, isopropyl alcohol, propylene oxide, cumene, synthetic glycerol, isoprene, and oxo alcohols. When propylene is produced in the presence of hydrogen, it is often accompanied by the formation of propane. Propane is a paraffin, a saturated hydrocarbon which is used as a component of household fuel, as an extractant, a refrigerant, or an aerosol propellant. Generally, it is required to separate propane from propylene before the propylene can be used to produce more valuable products. However, the boiling points of propane and propylene are very close to one another and separating propane from propylene has traditionally required an energy-intensive fractionation process known as superfractionation. Superfractionation generally refers to fractional distillation of compounds having the same number of carbon atoms per molecule.

The reaction product produced by a conversion process such as fluid catalytic cracking, pyrolysis of naphtha, and conversion of methanol to olefins is a light gas stream containing lighter components (e.g. hydrogen, nitrogen, etc.) methane, ethane and a substantial quantity of hydrocarbons of higher molecular weight, for example, propane, butane, pentane, and often their unsaturated analogs. Separation of these components to recover propylene requires a complex energy-intensive scheme, thus creating a need for more efficient separation processes which yield higher recovery levels of propylene. A typical ethylene separation section of an ethylene plant containing both cryogenic and fractionation steps to recover an ethylene product with a purity exceeding 99.5% ethylene is described in an article by V. Kaiser and M. Picciotti entitled, "Better Ethylene Separation Unit," that appeared in *Hydrocarbon Processing*, November 1988, pages 57–61 and is herein incorporated by reference. In the production of propylene, a by-product of the conversion process, a reactor effluent stream recovered from the conversion process is passed to a complex series of separation stages involving a combination of compression and fractionation steps to recover a $C_3$ hydrocarbon stream. Conventionally, the $C_3$ hydrocarbon stream is passed to a superfractionator known as a $C_3$ splitter to perform the separation of propylene from a feedstream consisting essentially of propylene and propane to produce a high purity propylene stream and a propane-containing stream. The $C_3$ splitter, or superfractionator, makes the final separation between propylene and propane. In this separation, propylene is removed as an overhead stream, and the propane stream is removed as the $C_3$ splitter bottom stream. The higher the purity of the propylene desired, the more energy intensive is the degree of superfractionation in the $C_3$ splitter. Typically, the $C_3$ splitter or propane/propylene splitter requires so many theoretical separation stages, or trays, that the column is constructed as two separate towers: a rectifier and a stripper. Lighter components such as hydrogen and methane which may be present in the $C_3$ hydrocarbon stream further complicate the separation.

Pressure swing adsorption (PSA) provides an efficient and economical means for separating a multi-component gas stream containing at least two gases having different adsorption characteristics. The more strongly adsorbable gas can be an impurity which is removed from the less strongly adsorbible gas which is taken off as product; or, the more strongly adsorbable gas can be the desired product, which is separated from the less strongly adsorbable gas. In PSA, a multi-component gas is typically fed to at least one of a plurality of adsorption zones at an elevated pressure effective to adsorb at least one component, while at least one other component passes through. At a defined time, the feedstream to the adsorber is terminated and the adsorption zone is depressurized by one or more co-current depressurization steps wherein pressure is reduced to a defined level which permits the separated, less strongly adsorbed component or components remaining in the adsorption zone to be drawn off without significant concentration of the more strongly adsorbed components. Then, the adsorption zone is depressurized by a counter-current depressurization step wherein the pressure on the adsorption zone is further reduced by withdrawing desorbed gas counter-currently to the direction of the feedstream. Finally, the adsorption zone is purged and repressurized. The combined gas stream produced during the counter-current depressurization step and the purge step is typically referred to as the tail gas stream. The final stage of repressurization is typically performed by introducing a slipstream of product gas comprising the lightest gas component produced during the adsorption step. This final stage of repressurization is often referred to as product repressurization. In multi-zone systems, there are typically additional steps, and those noted above may be done in stages. U.S. Pat. No. 3,176,444 issued to Kiyonaga, U.S. Pat. No. 3,986,849 issued to Fuderer et al., and U.S. Pat. Nos. 3,430,418 and 3,703,068 both issued to Wagner, among others, describe multi-zone, adiabatic PSA systems employing both co-current and counter-current depressurization, and the disclosures of these patents are incorporated by reference in their entireties.

U.S. Pat. No. 5,672,197, hereby incorporated by reference, discloses a process for the separation of a mixture of gases wherein an internal gas flow is pumped through a plurality of beds containing a pressure dependent adsorbent. The beds are connected in series. Gas is pumped from the most upstream of the beds to generate the internal gas flow, displacing gas through the series in the downstream direction. A first inlet flow is withdrawn from the most upstream bed. The first outlet flow consists primarily of the most highly adsorbed component. Feedstock is added downstream of the first outlet, separated by at least one bed and a second outlet flow is withdrawn from a second outlet in fluid communication with the most downstream bed in series. At the end of the cycle, gas pressure in the most downstream bed is increased to operating pressure, while pressure in the most upstream bed is reduced to the lower pressure. At the end of the cycle, valves are used to switch positions of the inlet and outlet ports and bed connections so that each bed effectively advances upstream with respect to the internal gas flow by one position, except for the most upstream bed which is effectively moved to the most downstream position.

Various classes of adsorbents are known to be suitable for use in PSA systems, the selection of which is dependent upon the feedstream components and other factors. Molecular sieves such as the microporous crystalline zeolite and non-zeolitic catalysts, particularly aluminophosphates (AlPO) and silicoaluminophosphates (SAPO), are known to promote reactions such as the conversion of oxygenates to hydrocarbon mixtures. Numerous patents describe this process for various types of these catalysts: U.S. Pat. No. 4,310,440 (Wilson et al.), U.S. Pat. No. 4,567,029 (Wilson et al.), U.S. Pat. No. 5,095,163 (Barger), U.S. Pat. No. 5,191,141 (Barger), U.S. Pat. No. 5,126,308 (Barger), U.S. Pat. No. 4,973,792 (Lewis), and 4,861,938 (Lewis). The above U.S. patents are hereby incorporated by reference.

U.S. Pat. No. 5,744,687 and U.S. Pat. No. 5,365,011 disclose a process for the integration of a PSA zone containing an adsorbent selective for the adsorption of ethylene and from a catalytic cracking process at an adsorption temperature above 50° C. to about 250° C. The adsorbent is selected from the group consisting of zeolite 4A, zeolite 5A, zeolite 13X, and mixtures thereof. The adsorbed ethylene and propylene is desorbed from the adsorbent by reducing the pressure or raising the temperature, or by reducing the pressure and raising the temperature.

A paper entitled, "Olefin-Paraffin Separations by Adsorption: Equilibrium Separation by π-Complexation vs. Kinetic Separation", by S. U. Rege, J. Padin, and R. T. Yang and published in the AIChE Journal, volume 44, 1998, at page 799 and herein incorporated by reference, compares the performance of a PSA process using 4A zeolite, carbon molecular sieve, and a sorbent based on a silica substrate over which silver nitrate has been dispersed for the separation of propylene from mixtures of propylene and propane.

Recovering propylene from cracking, oxygenate conversion, and propane dehydrogenation processes is an expensive and complex process involving extensive compression and superfractionation to separate ethylene from the C3 hydrocarbons, and finally superfractionation to separate the propylene from the propane. Prior attempts to employ adsorptive separation have found it difficult to achieve both high purity and high recovery of propylene. Processes are sought which enable the concentration and recovery of the propylene from cracking and oxygenate conversion effluent without expensive superfractionation steps.

It is an objective of the present invention to provide a separation process for the production of high purity propylene which does not require superfractionation.

It is an objective of the present invention to provide a process for the production of high purity propylene at a high propylene recovery.

SUMMARY OF THE INVENTION

The present invention relates to a vacuum swing adsorption process for the purification of propylene from a feedstream comprising propylene and propane. The invention is based on the discovery that a small pore aluminophosphate molecular sieve, AlPO-14, can be employed in a variety of adsorptive processes to purify a propylene stream and recover a high purity propylene product stream while also obtaining a high propylene recovery. In particular, AlPO-14 was found to selectively adsorb propylene while essentially excluding propane at adsorption temperatures between about 25° C. and about 125° C. Surprisingly, it was discovered that the AlPO-14 adsorbent exhibited a favorable adsorption isotherm for propylene at propylene partial pressures up to about 4 bar (60 psia). The linear character of the AlPO-14 adsorption isotherm, particularly at propylene partial pressures below about 2 bar, makes the AlPO-14 adsorbent useful in vacuum swing adsorption processes directed to the purification of propylene by adsorption. Furthermore, the adsorption of propylene on the AlPO-14 adsorbent appeared to approach a saturation level at which little additional adsorption occurred at adsorption pressures corresponding to propylene partial pressures above about 3 bar. Although the adsorbent has a high selectivity for the adsorption of propylene over propane and a good working capacity, it is a difficult problem to obtain both a high purity propylene product at a similarly high propylene recovery in an adsorptive separation process. The present invention comprises a vacuum swing adsorption process using the AlPO-14 adsorbent and employing a cycle which includes vacuum desorption to provide a solution to this problem by producing a high purity propylene product and providing greater than about 80% recovery of the high purity propylene product based on the moles of propylene in the feedstream.

In one embodiment, the present invention is a vacuum swing adsorption process for the. separation of propylene from a feed;stream comprising propylene and propane to produce a high purity propylene product. The process comprises a series of steps. The feedstream at effective adsorption conditions in an adsorption step is passed to a first adsorption bed of a plurality of adsorption beds. Each of the adsorption beds contains a selective adsorbent comprising AlPO-14 to produce a raffinate stream, comprising propane. The passing of the feedstream to the first adsorption bed is terminated and the first adsorption bed is co-currently purged at a co-purge pressure essentially equal to the adsorption pressure with a recycle stream to provide a purge gas stream comprising propane. The first adsorption bed is co-currently vented to a vent pressure and a vent stream is withdrawn. The first adsorption bed is co-currently depressurized to a provide-purge pressure lower than the vent pressure to produce a provide purge gas and the provide-purge gas is passed to another adsorption bed. The first adsorption bed is further co-currently depressurized in a first equalization step to an equalization pressure lower than the provide-purge pressure to produce an equalization gas and the equalization gas is passed to another adsorption bed. The first adsorption bed is counter-currently depressurized in an evacuation step to a desorption pressure to provide a first desorption stream comprising propylene. The first adsorption bed is countercurrently purged with a vacuum purge gas stream from another adsorption bed to produce a second desorption stream comprising propylene. The first adsorption bed is countercurrently repressurized in a second equalization step to about the equalization pressure. The first adsorption bed is further counter-currently repressurized to about the adsorption pressure with at least a portion of the raffinate stream. The first desorption stream and the second desorption stream are compressed to provide the high purity propylene product and at least a portion of the high purity propylene product is recycled to provide the recycle stream. The above steps are repeated in each of the adsorption beds to provide a continuous process.

BRIEF DESCRIPTION OF THE FIGURES

FIG. 1 is an adsorption isotherm for propylene over AlPO-14 adsorbent at 25° C.

FIG. 2 is an adsorption isotherm for propylene over AlPO-14 adsorbent at 70° C.

FIG. 3 is an adsorption isotherm for propylene over AlPO-14 adsorbent at 120° C.

FIG. 4 is a chart of propylene recovery as a function of purity for the vacuum swing adsorption process of the present invention.

FIG. 5 is a chart of pressure profile for the vacuum swing adsorption process of the present invention.

DETAILED DESCRIPTION OF THE INVENTION

The present invention is directed to the separation of propane from a feedstream comprising propane and propylene in an adsorption process to produce an adsorbed phase rich in propylene and a non-adsorbed phase rich in propane. Some non-condensables such as carbon dioxide, carbon monoxide, and hydrogen which may be present in commercially available feedstreams comprising propylene and propane will appear in the non-adsorbed phase. Upon desorption at a desorption pressure, that is reduced relative to the adsorption pressure, the propylene is recovered as a high purity propylene product. Preferably, a high purity propylene product comprises at least 95 mol-% propylene, and more preferably, the high purity propylene product comprises at least 99 mol-% propylene.

It was discovered that the AlPO-14 adsorbent of the present invention can be employed in an adsorptive separation process at an effective adsorption temperature less than 120° C. Propane appeared to be excluded from the AlPO-14 and the amount adsorbed was experimentally not detectable at adsorption temperatures between about 25° C. and 120° C. This implies a high selectivity for propylene based on molecular size exclusion. Preferably, the AlPO-14 adsorbent is employed at an effective adsorption temperature between about 25° C. and 120° C. More preferably, the AlPO-14 adsorbent is employed at an effective adsorption temperature between about 70° C. and about 100° C. The effective total pressure for adsorption may range between about 0.5 bar and about 30 bar, and the effective total pressure for desorption may range between about 20 millibars to about 1 bar. The use of AlPO-14 was found to be sensitive to the adsorption pressure. More particularly, the AlPO-14 adsorption is sensitive to the propylene partial pressure at the adsorption conditions. The propylene partial pressure is the contribution of the propylene fraction to the total pressure of the stream. At adsorption conditions wherein the propylene partial pressure is high, it is believed that adsorbed propylene may partially condense on the adsorbent, reducing the adsorption capacity and effectiveness of the adsorbent. When the adsorption temperature is less than 120° C., the propylene partial pressure for effective adsorption comprises less than about 4 bar. As the adsorption temperature is reduced, the propylene partial pressure for effective adsorption is reduced. Preferably, when the adsorption temperature ranges between about 70° C. and about 100° C., the propylene partial pressure for effective adsorption comprises between about 0.5 and about 2 bar. The process of the present invention can be carried out in a separation zone selected from the group consisting of a pressure swing adsorption zone, a vacuum swing adsorption zone, a temperature swing adsorption zone, and a membrane separation zone. Vacuum desorption, heating, and combinations thereof are preferred to remove adsorbed propylene from the AlPO-14 adsorbent. Preferably, the propylene partial pressure for effective desorption ranges between about 0.01 and 0.5 bar. If heating is employed for desorption, it is preferred to employ a heated purge gas to counter-currently purge an adsorption bed. Preferably, the heated purge gas is heated to a desorption temperature of between about 70° C. and 120° C.

The feedstream, comprising propane and propylene, may contain from about 5 to about 90 mol-% propylene with the remainder being essentially propane. The feedstream may be derived from any hydrocarbon cracking or formation process generally employed in the petroleum refining and petrochemical industries. Such cracking processes may include the cracking of natural gas, naphtha, and atmospheric gas oil for the production of ethylene and also producing propylene as a by-product. The feedstream may also be produced in a process for the conversion of an oxygenate into light olefins. In general, the reaction products of these processes are compressed fractionated in a conventional manner to produce the feedstream for the present invention.

The adsorbent of the present invention preferably is incorporated into solid particles in which the adsorbent is present in an amount effective to promote the desired hydrocarbon separation. Solid particles comprising the molecular sieve and a binder may be formed into shapes such as pills, pellets, granules, rings, spheres, etc. Generally, a slurry mixture comprising the molecular sieve, binder, and water is prepared and the slurry mixture is blended by sonification, milling, etc. prior to formation of the solid particles by extrusion, spray-drying, etc. In one aspect, the solid particles comprise an adsorptively effective amount of the adsorbent and at least one matrix material, preferably selected from the group consisting of binder materials, filler materials, and mixtures thereof to provide a desired property or properties, e.g., desired adsorbent dilution, mechanical strength, and the like to the solid particles. Filler and binder materials include, for example, synthetic and naturally occurring substances such as metal oxides, clays, silicas, aluminas, silica-aluminas, silica-magnesias, silica-zirconias, silica-thorias, silica-berylias, silica-titanias, silica-alumina-thorias, silica-alumina-zirconias, aluminophosphates, mixtures of these, and the like. The preparation of solid particles comprising adsorbent and matrix materials is conventional and well known in the art and, therefore, need not be discussed in detail.

It was discovered that AlPO-14, a small pore aluminophosphate molecular sieve, selectively adsorbed propylene and essentially excluded propane. AlPO-14 as disclosed in U.S. Pat. No. 4,310,440 is a member of a class of aluminophosphates ($AlPO_4$-n) which have various crystalline structures (current references to such compounds no longer use the subscript 4). The class of materials contains structures wherein the frameworks are composed of tetrahedral $AlO_4$ and $PO_4$ units. One characteristic of this class of non-zeolitic materials is that the structures do not contain framework charge balancing cations like those contained in zeolite molecular sieve structures. Although non-zeolite frameworks are electrically neutral, adsorbate molecules, that is, molecules on the framework of these materials, can interact with a local non-zero electric field present on the surface of the structure. It is believed that this local electric field can arise from the difference in electro-negativities between the aluminum and phosphorous atoms making up the structure. One key feature of the AlPO-14 structure is its pore window diameter which is about 3.8 angstroms. Although the pore size of the AlPO-14 is essentially the same as a zeolite 4A, the AlPO-14 has a different crystalline structure which can be considered a channel system of small pores that is capable of excluding the entry of propane by a steric hindrance effect which prevents the propane from entering into the internal pore/channel structure, while permitting the relatively rapid adsorption and desorption of propylene.

In one embodiment, a modified adsorption process is employed to produce a high purity propylene stream at a high recovery. By the term "high purity propylene", it is meant that the high purity propylene product stream comprises at least 90 mol-% propylene. More preferably, the high purity propylene stream comprises at least 95 mol-%, and most preferably, the high purity propylene product stream comprises at least 99 mol-% propylene. By the term "high recovery", it is meant that the high purity propylene product recovered comprises at least 80% of the propylene in the feedstream to the process, or the ratio of the propylene recovered to the propylene in the feedstream is greater than about 80%. Preferably, the recovery of high purity propylene comprises at least 90% of the moles of propylene in the feedstream to the process.

The process for the separation of propylene of the present invention can advantageously be employed in a wide variety of petroleum refining and petrochemical operations where the objective is the purification of a propane/propylene stream or the recovery of propylene from a vent stream. The present invention can be used alone or in any combination with fractionation to perform a rough-cut separation prior to final fractionation, or can be used in a scheme wherein fractionation may perform a rough cut distillation followed by the adsorption process of the present invention as a finishing step. Examples of such applications include recovering propylene from the vent streams a polypropylene process, recovering propylene from mix $C_3$ hydrocarbons produced in a fluid catalytic cracking unit, and recovering propylene in a light ends fractionation plant in an ethylene plant or downstream from a conversion process for the production of light olefins from oxygenates. There are also applications in the propylene derivative technology areas such as hydrocarbon alkylation, isopropanol production, hydrocarbon partial oxidation, oxo alcohol production, etc. In such applications, the buildup of propane is often purged along with valuable propylene. Using the present invention, the propylene in these vent streams can be effectively recovered and returned to the reaction zone for improved conversion and overall process improvement.

The vacuum swing adsorption process of the present invention is now described for a vacuum swing adsorption unit comprising six adsorption beds. A vacuum swing adsorption cycle that can be employed to purify the feedstream to produce a high purity propylene product is shown in Table 1. Included in the vacuum swing adsorption cycle is an. adsorption step ADS, a co-purge step COP, a vent step VNT, a provide-purge step PP, an equalization step EQ, an evacuation EV, or blowdown step, an idle period ID, a vacuum purge step VP, an equalization step EQ, and a final repressurization step RP. According to the cycle shown in Table 1, the first adsorption bed undergoes an adsorption step to adsorb propylene on the AlPO-14 adsorbent, and a raffinate stream comprising propane is withdrawn from the first adsorption bed. The raffinate stream is passed to a raffinate tank. At the conclusion of the adsorption step, prior to propylene breakthrough, the first adsorption bed is co-purged with a co-purge stream such as a compressed propylene stream to force propane from the void spaces of the first adsorption bed. A co-purge effluent stream comprising propane is withdrawn and passed to the raffinate tank during the adsorption step. The first adsorption bed then undergoes a co-current depressurization, or vent step reducing the pressure to a vent pressure of about 2.3 bar and a vent effluent stream, comprising propane, is withdrawn. The vent effluent stream may be used for fuel or as a propane product. The first adsorption bed undergoes a further co-current depressurization step to a provide-purge pressure and a provide-purge stream is withdrawn and passed to another adsorption bed undergoing a vacuum purge step. The first adsorption bed is still further depressurized in a co-current equalization step and an equalization stream is withdrawn and passed to another adsorption bed undergoing the counter-current equalization step. After an idle period, the first adsorption bed is counter-currently evacuated to a blowdown pressure of about 0.3 bar and a first desorption stream comprising propylene is withdrawn. The first adsorption bed is counter-currently purged with at least a portion of the provide-purge stream and a second desorption stream is withdrawn. The first and second desorption streams are combined to provide a propylene product stream which is compressed to provide a compressed propylene stream and passed to a propylene tank. The first adsorption bed is counter-currently repressurized with a portion of the equalization stream in an equalization step, raising the first adsorption bed to an equalization pressure. The first adsorption bed is further counter-currently repressurized in a repressurization step with a portion of the raffinate stream. In the cycle described herein above, the adsorption step time, or the time period over which the adsorption step takes place is approximately equal to the vent step time, or the time over which the vent step takes place. FIG. 1 presents a summary of the simulation results for using the cycle of the present invention to process a feed comprising 70 mol-% propylene in a mixture thereof with propane for producing a high purity propylene product, containing at least 99+mol-% propylene, at a recovery in excess of 80 mol-% propylene, based on the feedstream. Preferably, the process of the present invention is carried out using at least 4 adsorption beds. More preferably, the process of the present invention is carried out using between about 4 to 12 adsorption beds.

One unexpected benefit of the vacuum swing adsorption process of the present invention is the combination of the production of high purity propylene and the achievement of high recovery rates of the propylene product over the AlPO-14 adsorbent.

TABLE 1

| PROPYLENE VSA CYCLE | | | | | | | | | | | | | | | | | | |
| --- | --- | --- | --- | --- | --- | --- | --- | --- | --- | --- | --- | --- | --- | --- | --- | --- | --- | --- |
| 1 | ADS | | COP | | VNT | | PP | EQ | ID | | EV | | VP | | EQ | | RP | |
| 2 | EQ | REP | | ADS | | COP | | VNT | | PP | EQ | ID | | EV | | VP | | |
| 3 | EV | VP | EQ | RP | | ADS | | COP | | VNT | | PP | EQ | ID | | | | |
| 4 | EQ | ID | EV | VP | EQ | RP | | ADS | | COP | | VNT | | PP | | | | |
| 5 | VNT | PP | EQ | ID | EV | VP | EQ | RP | | ADS | | COP | VNT | | | | | |
| 6 | COP | | VNT | | PP | EQ | ID | EV | VP | EQ | RP | | ADS | | | | | |

EXAMPLES

Example 1

The propylene adsorption screening tests were conducted in a modified BET adsorption apparatus. The apparatus measures adsorption by sensing changes in pressure and temperature inside a reference volume which is attached to an adsorption vessel containing the adsorbent sample. The adsorbent sample was maintained at a steady temperature by the action of a temperature-controlled bath. The reference volume can be isolated from the adsorbent vessel by means of an isolation valve. The reference volume may also be connected or isolated from a gas source by means of another isolation valve, and finally the absolute pressure of the reference volume may be controlled by means of a high vacuum pump which is also connected to the reference volume by means of a third isolation valve. Adsorption measurements were made by first evacuating the reference volume and the adsorbent sample vessel to a pressure of approximately $5 \times 10^{-6}$ torr while heating the adsorbent and adsorbent vessel to an activation temperature of approximately 350° C. The temperature of activation was controlled and monitored. The activation was considered complete after the pressure of the system was dropped to $5 \times 10^{-6}$ torr (generally, about 16 hours). After activation, the sample was isolated from the reference volume and the evacuation pump and was cooled to the desired adsorption temperature. The reference volume also evacuated to $5 \times 10^{-6}$ torr was also isolated from the vacuum pump and was charged to a vapor pressure of about 5 torr with about 99.99 mol-% (research grade) pure propylene gas. The pressure of gas was monitored by an MKS Baratron Pressure Transducer. Once stable readings were obtained on both the pressure and temperature within the reference volume, the isolation valve separating the adsorbent sample from the reference volume was opened and the pressure and temperature of the system were monitored until they stabilized, i.e., changing no more than by 1 part in $10^6$ torr within one minute. Propylene isotherms were obtained by repeating the isolation, charging and equilibration of the reference volume with the adsorbent vessel until a pre-determined loading level or pressure level were obtained. Propylene loadings on the adsorbent samples were reported in FIGS. 1, 2, and 3 as a function of the pressure of the propylene vapor in terms of the mmols/g (millimoles per gram) of the propylene gas loaded on the adsorbent for zeolite 4 A and AlPO-14, a small pore aluminophosphate, respectively. The isotherms for the 4 A zeolite and AlPO-14 adsorbents were determined at 25° C., 70° C., and 120° C. A comparison of the results at 25° C., 70° C., and 120° C. that the 4A zeolite adsorption isotherms exhibited a sharp initial adsorption of the propylene at very low pressures (less than 0.3 bar (5 psia)) and then a very small incremental adsorption as the pressure is increased to about 1 bar. Surprisingly, the AlPO-14 adsorbent exhibited a more gradual adsorption slope as a function of increasing pressure relative to the 4 A zeolite, and the AlPO-14 isotherms became more linear in character as the temperature approached 120° C. Surprisingly, propane was found to be essentially excluded from the AlPO-14 adsorbent at 25° C., 70° C., and 120° C. Propane adsorption was apparently below the detection limit of the apparatus.

Example II

Table 2 presents a comparison of adsorbent loading capacity for pure propylene over a range of adsorption pressures between about 0.5 bar and 1 bar at adsorption temperatures between about 25° C. and about 120° C. for the AlPO-14 adsorbent of the present invention and zeolite 4A, the adsorbent representative of the prior art. The loading capacities shown were determined from the AlPO-14 isotherm data generated in Example I. The zeolite 4A capacity loadings were similarly derived. Surprisingly, the AlPO-14 indicates significant adsorption capacity at temperatures belovi 120° C. where, at the corresponding conditions, the zeolite 4 A indicated essentially no adsorption capacity.

TABLE 2

| Comparison of Adsorbent Loading Capacity, mmol/g | | | |
|---|---|---|---|
| Adsorption Pressure Range | Adsorption Temperature, ° C. | | |
| (0.5 to 1.0 bar) | 25 | 70 | 120 |
| AlPO-14 | 0.15 | 0.4 | 0.38 |
| Zeolite 4A (Prior Art) | nil | nil | 0.35 |

Example III

The adsorbent loading capacity for pure propylene of the AlPO-14 adsorbent increased with increasing pressure up to about 2 bar. Table 3 presents the loading capacity of the adsorbent of the present invention over a pressure range between about 0.3 bar and about 2.0 bar. These results indicate almost a linear increasing capacity with increasing pressure range up to about 2.0 bar. Surprisingly, it was discovered that little increase in capacity resulted from extending the final pressure above about 2 bar.

TABLE 3

| AlPO-14 Adsorbent Loading Capacity, mmol/g | | | |
|---|---|---|---|
| Adsorption Pressure Range | Adsorption Temperature, ° C. | | |
| (0.3 to 2.0 bar) | 25 | 70 | 120 |
| AlPO-14 | 0.45 | 0.70 | 0.70 |

Example IV

A hysteresis effect was observed when comparing the adsorption branch of the adsorption isotherm for propylene over AlPO-14 with a desorption branch obtained by reversing the steps of Example I and measuring the adsorbent loadings as the pressure 5 is reduced. The AlPO-14 adsorbent exhibited a tendency to retain the adsorbed species, propylene. The hysteresis effect is strong at low temperatures; however, as the temperature is increased, the hysteresis effect was reduced. To illustrate this phenomenon, Table 4 presents a summary of the propylene loading on desorption to about 0.2 bar over a range of desorption temperatures from about 25° C. to 120° C. It was found that the residual propylene loading decreased with increasing temperature, suggesting the use of the addition of a heated purge step in pressure swing and vacuum adsorption processes to return the adsorbent to essentially full adsorption capacity between cycles when the adsorption temperature approaches 25° C.

TABLE 4

| Residual Desorption Capacity, mmol/g | | | |
|---|---|---|---|
| | Desorption Temperature, ° C. | | |
| Desorption Pressure, bar | 25 | 70 | 120 |
| 0.2 | 0.8 | 0.4 | 0.2 |

Example V

An engineering simulation of the vacuum swing adsorption unit using AlPO-14 adsorbent was prepared based on the isotherm data generated in Example I. The vacuum swing adsorption unit comprises six adsorption beds. The feedstream comprising 70 mol-% propylene and 30 mol-% propane. The vacuum swing adsorption process using 6 adsorption beds containing AlPO-14 adsorbent is operated according to the cycle chart presented in Table 1. At an adsorption temperature of about 100° C. and adsorption pressure of about 3 bar (45 psia), the feedstream is passed to the first adsorption bed. During the adsorption step, an adsorption effluent, or raffinate stream comprising propane is removed from the first adsorption bed and passed to a raffinate tank. The adsorption step is terminated prior to propylene breakthrough and the first adsorption bed is co-purged with a recycle stream comprising propylene at a co-purge pressure essentially equal to the adsorption pressure and a co-purge effluent stream comprising propane is withdrawn from the first adsorption bed. The co-purge effluent stream is passed to the raffinate tank and therein combined with the raffinate stream. The first adsorption bed is now vented in a co-current depressurization step, lowering the pressure in the first adsorption bed to a vent pressure of about 2.3 bar (35 psia) to withdraw a vent stream comprising propane. The first adsorption bed is further co-currently depressurized in a provide-purge step, counter-currently depressurized in an equalization step to an equalization pressure between the vent pressure and the desorption pressure. After an idle period, the first adsorption bed is evacuated to the desorption pressure of about 0.3 bar (4.5 psia) and a first desorption stream, comprising propylene, is withdrawn. The first adsorption bed is counter-currently purged at desorption pressure to recover a second desorption stream. The first and second desorption streams are combined and passed to a compressor to compress the first and second desorption streams to about the adsorption pressure to provide a compressed propylene stream. At least a portion of the compressed propylene stream is used as the recycle stream to perform the co-purge step. FIG. 4 presents a summary of the simulation results for producing a high purity propylene product, containing at least 99+mol-% propylene, at a recovery in excess of 80% propylene, based on the propylene content of the feedstream. FIG. 5 presents a pressure profile for the operation of the vacuum swing cycle of the present invention.

What is claimed is:

1. A vacuum swing adsorption process For the separation of propylene from a feedstream comprising propylene and propane to produce a high purity propylene product, said process comprising:

a) passing the feedstream at effective adsorption conditions in an adsorption step to a first adsorption bed of a plurality of adsorption beds, each of said adsorption beds containing a selective adsorbent comprising AlPO-14 to produce a raffinate stream, comprising propane;

b) terminating the passing of the feedstream to the first adsorption bed and co-currently purging the first adsorption bed at a co-purge pressure essentially equal to an adsorption pressure with a recycle stream to provide a purge gas stream comprising propane;

c) co-currently venting the first adsorption bed to a vent pressure and withdrawing a vent stream;

d) co-currently depressurizing the first adsorption bed to a provide-purge pressure lower than the vent pressure to produce a provide-purge gas and passing the provide-purge gas to another adsorption bed:

e) further co-currently depressurizing the first adsorption bed in a first equalization step to an equalization pressure lower than the provide-purge pressure to produce an equalization gas and passing the equalization gas to another adsorption bed;

f) counter-currently depressurizing the first adsorption bed in an evacuation step to a desorption pressure to provide a first desorption stream comprising propylene;

g) counter-currently purging the first adsorption bed with a vacuum purge gas stream from another adsorption bed to produce a second desorption stream comprising propylene;

h) counter-currently repressurizing the first adsorption bed in a second equalization step to about the equalization pressure;

i) further counter-currently repressurizing the first adsorption bed to about the adsorption pressure with at least a portion of the raffinate stream;

j) compressing the first desorption stream and the second desorption stream to provide the high purity propylene product;

k) recycling at least a portion of the high purity propylene product to provide the recycle stream; and l) repeating steps (a) to (k) for each of the adsorption beds to provide a continuous process.

2. The vacuum swing adsorption process of claim 1 wherein the effective adsorption conditions include a propylene partial pressure comprising between about 0.5 and about 4 bar.

3. The vacuum swing adsorption process of claim 1 wherein the effective adsorption conditions include an adsorption temperature less than 120° C.

4. The vacuum swing adsorption process of claim 1 wherein the desorption pressure comprises between about 0.01 and about 0.5 bar.

5. The vacuum swing adsorption process of claim 1 wherein the vacuum purge gas comprises the provide-purge gas.

6. The vacuum swing adsorption process of claim 1 wherein the high purity propylene product comprises at least 95 mol-% propylene.

7. The vacuum swing adsorption process of claim 1 wherein a ratio of the propylene recovered to the propylene in the feedstream is greater than about 80%.

8. The vacuum swing adsorption process of claim 1 wherein the plurality of adsorption beds comprises at least 4 adsorption beds.

9. The vacuum swing adsorption process of claim 1 wherein the plurality of adsorption beds comprises from 4 to 12 adsorption beds.

* * * * *